Patented May 24, 1927.

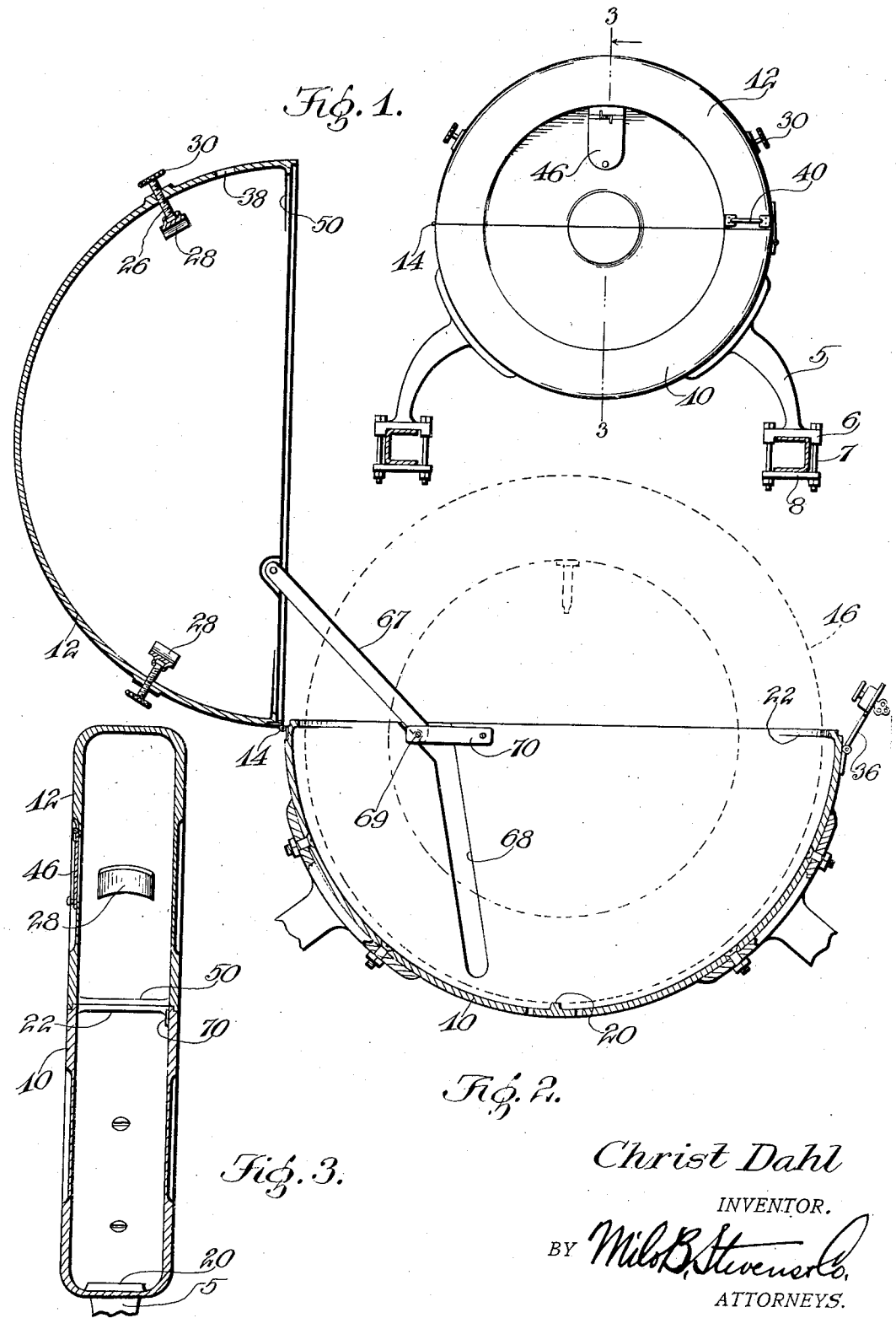

1,629,777

UNITED STATES PATENT OFFICE.

CHRIST DAHL, OF CHICAGO, ILLINOIS.

TIRE CARRIER AND PROTECTOR.

Application filed December 2, 1925. Serial No. 72,791.

This invention relates to tire carriers and protectors especially adapted for use on automobiles.

Briefly stated, an important object of this invention is to provide a tire carrier having simple means whereby the same may be opened for the insertion of a tire therein or for the removal of the tire and which is provided with means to hold the tire against rattling and chafing as a result of the movement of the vehicle.

Another and equally important aim of the invention is to provide a tire carrier which is substantially dust-proof and which is provided with means for the discharge of any water, dust, or the like, which may by chance enter the carrier.

Another aim of the invention is to provide a tire carrier which is of highly simplified construction, attractive, and cheap to manufacture.

Other objects and advantages will be apparent during the course of the following description.

In the accompanying drawing forming a part of this application and in which like numerals are employed to designate like parts throughout the same, Figure 1 is an elevation of the improved tire carrier and protector applied;

Fig. 2 is a vertical sectional view through the same open,

Fig. 3 is a vertical transverse sectional view through the tire carrier in its closed position, as taken in magnified form on the line 3—3 of Fig. 1.

In the drawing, wherein for the purpose of illustration is shown a preferred embodiment of the invention, the numerals 5 designate a pair of arms having attaching devices 6 by means of which the same may be connected to the frame or any other part of the automobile. The fastening device as illustrated in Figure 1 consists of bolts 7 extended through straps 8 and the straps may be forced into engagement with the frame by the tightening of the bolts.

The arms 5 have rigid connection with and support a carrier consisting of lower and upper semi-circular sections 10 and 12, the sections being hingedly connected as indicated at 14. The sections are hollow for the reception of a tire 16 and as shown in Fig. 2 the lower section may be provided with lugs or spacing members 20 to support the tire 16 in spaced relation to the bottom of the section 10 to avoid wear and chafing. Figure 2 also illustrates that the ends of the lower section 10 are offset to provide arcuate spacing members 22 which cooperate with the lugs 20 in spacing the tire from the lower section.

The upper section is provided with pressure screws 26 having shoes 28 curved to conform to the curvature of the crown of the tire and adapted to engage the crown so as to hold the tire firmly in place. As shown in Fig. 2, the pressure screws 26 have knurled heads 30 by means of which the screws may be easily turned to force the shoes 28 into firm engagement with the tire.

In carrying out the invention, the lower section may be provided with a hinged lock 36 which may be provided with a bolt or locking element to extend through an opening 38 in the upper section whereby to hold the sections in closed position. However, any other suitable locking device may be employed. A handle 40 is secured to one end of the section 12 to form a means whereby the upper section may be easily swung to open position for the insertion or removal of a tire.

The valve stem of the tire is accessible through an opening in the upper section of the carrier, which opening is normally closed by a spring pressed hinged cover 46. This cover 46 is hinged at its upper end and extends over the opening in the upper section so as to exclude dust, rain, etc.

It will be seen with reference to Fig. 2 that the upper section 12 may be provided at the ends thereof with arcuate internal ribs or shoulders 50 which rest upon the transverse ribs or shoulders 22 to firmly seat the upper section and at the same time to provide arcuate shoulders which hold the tire away from the carrier.

With reference to the foregoing description taken in connection with the accompanying drawing it will be seen that a tire carrier constructed in accordance with this invention is attractive, of highly simplified construction, and may be advantageously employed for carrying and protecting a tire. The two sections completely enclose the tire to conceal the same and at the same time protect the tire from theft and the elements. When it is necessary to change a tire the upper section may be moved to open position and the spare tire will be found to be in a clean state and thereby reduce the unpleasantness of changing a tire.

Fig. 2 clearly illustrates that the upper section 12 has pivotal connection with a link 67 which moves in a slot 68 in the lower section and which has its terminal portion provided with a notch or hook to engage a transverse pin 69 carried by a strap 70 at the upper portion of the slot. It is believed to be obvious that when the cover is opened to its fullest extent the hook at the terminal portion of the link 67 will be engaged with the transverse pin 69 to hold the section in open position. When it is desired to move the upper section to closed position it is merely necessary to disengage the link 67 from the pin 69 and then drop or lower the upper section.

Having thus described the invention, what is claimed is:

A tire carrier comprising a stationary hollow semi-cylindrical tire receiving section, a similarly shaped cover section hinged thereto, internal ribs formed on the abutting peripheral edges of said sections for seating said cover section in service position, said ribs being extended to form spacers for a tire in the carrier, and manually adjustable means for binding a tire in said carrier against said spacer ribs.

In testimony whereof I affix my signature.

CHRIST DAHL.